(12) United States Patent
Sugiyama et al.

(10) Patent No.: US 6,463,398 B2
(45) Date of Patent: *Oct. 8, 2002

(54) ROTARY SPEED DETECTOR

(75) Inventors: Masanori Sugiyama; Hiroyuki Matsubara; Chiaki Honma, all of Aichi-ken (JP)

(73) Assignee: Aisin Seiki Kabushiki Kaisha, Aichi-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/217,062

(22) Filed: Dec. 21, 1998

(65) Prior Publication Data

US 2002/0013674 A1 Jan. 31, 2002

(30) Foreign Application Priority Data

Dec. 22, 1997 (JP) ............................................. 9-353414

(51) Int. Cl.$^7$ ................................................. G01P 3/00
(52) U.S. Cl. ........................ 702/145; 702/147; 702/148
(58) Field of Search ................................. 702/145, 148, 702/142, 147; 364/565

(56) References Cited

U.S. PATENT DOCUMENTS 4,527,248 A * 7/1985 Takase et al. ................ 364/565
4,569,027 A * 2/1986 Nakano et al. .............. 702/147

FOREIGN PATENT DOCUMENTS

DE 3709395 9/1988
DE 3821938 1/1990
DE 4320108 12/1994

* cited by examiner

Primary Examiner—Daniel J. Colilla
Assistant Examiner—Minh Chau
(74) Attorney, Agent, or Firm—Sughrue Mion, PLLC

(57) ABSTRACT

A rotary speed detector includes a rotating angle sensor for outputting digital signals which constitute rotating angle data of a rotating member, an angle variation calculator for calculating an angle variation with respect to a predetermined interval of time and a revolving speed calculator for calculating rotary speeds from the angle variation.

1 Claim, 2 Drawing Sheets

ROTARY SPEED DETECTOR

FIELD OF THE INVENTION

Figure 1:
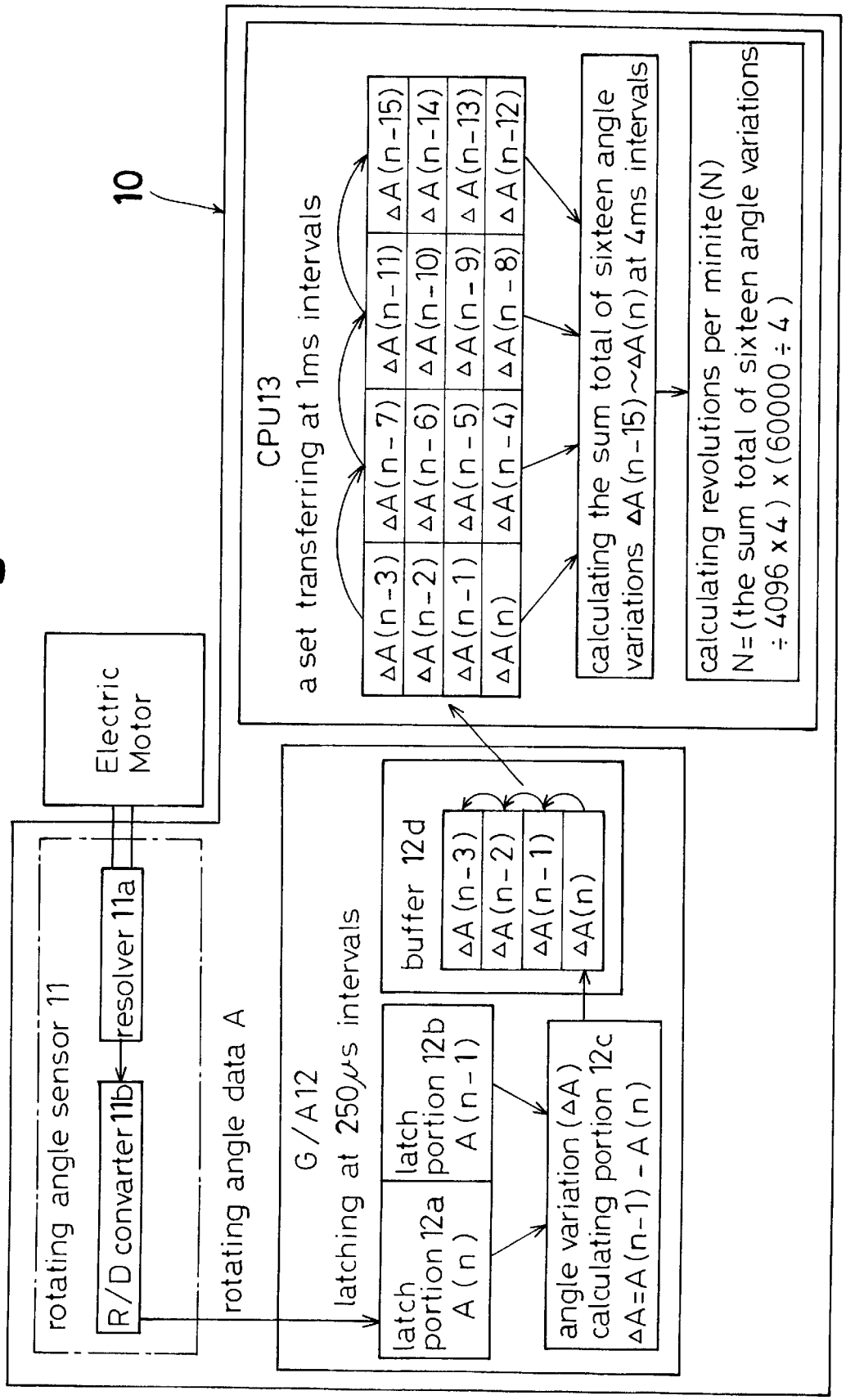

The present invention relates to a rotary speed detector and, in particular, to a rotary speed detector which calculates revolutions per minute (rpm) of an electric motor of a vehicle.

BACKGROUND OF THE INVENTION

A conventional rotary speed detector includes a resolver, a transforming means, a measuring means and a calculating means. The resolver is fixed to an output shaft of an electric motor and outputs analog signals which represent rotational angle data of the shaft, that is, data pertaining to the degree of rotation with respect to a known baseline. The transforming means transforms the analog signals into angle pulse signals. The angle pulse signal is equal to or occurs at some fraction of a revolution. For example, the angle pulse signal provides that one cycle should be equal to one-quarter revolution of the shaft. The measuring means measures each output cycle, from the start of an angle pulse signal until the end of the angle pulse signal. The calculating means calculates the revolving speed of the electric motor from the cycle period.

However, in using the detector described above, as the speed of the electric motor becomes lower, the measuring period for each cycle becomes longer. Therefore, calculating the rotary speed requires a long time, when the revolutions per minute (rpm) of the electric motor are low.

In addition, the measuring means further includes a counting pulse source for measuring the cycle period. The counting pulse source outputs counting pulses at regular intervals. The output of the counting pulses is without regard to the angle pulse signals. As a result, the accuracy of the measuring cycle period is not constant between a low revolving speed and a high revolving speed.

SUMMARY OF THE INVENTION

The present invention provides a rotary speed detector without the foregoing drawbacks.

In accordance with the present invention, a rotary speed detector comprise a rotating angle sensor outputting digital signals which constitute rotating angle data of a rotary member, an angle variation calculating means for calculating an angle variation with respect to a predetermined interval of time and a rotary speed calculating means for calculating rotary speeds from the angle variation.

BRIEF DESCRIPTION OF THE DRAWING FIGURES

Figure 2:
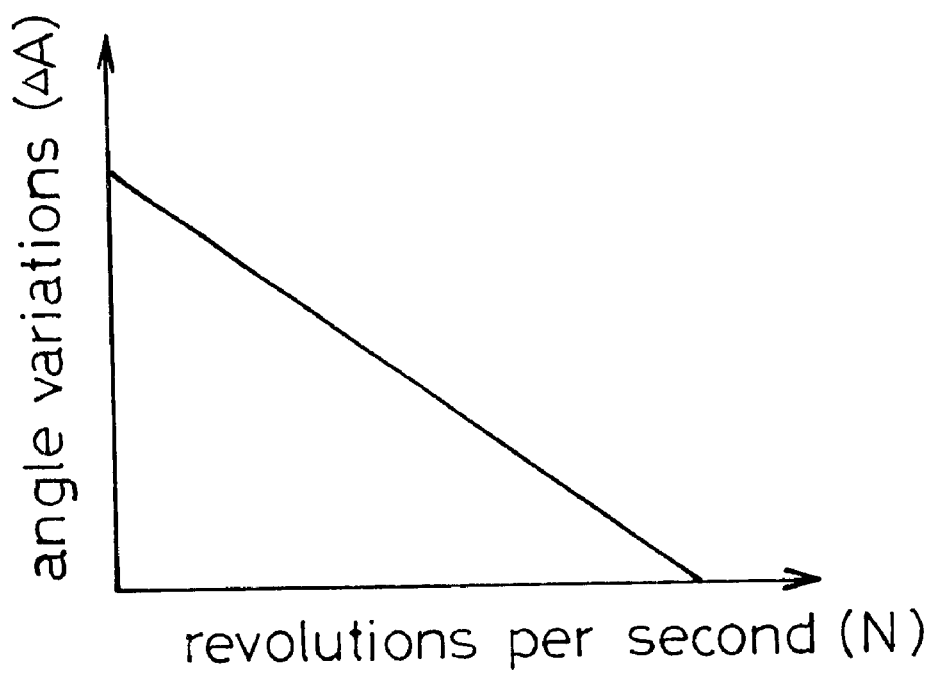

The foregoing and additional features of the present invention will become more apparent from the following detailed description of a preferred embodiment thereof when considered with reference to the attached drawings, in which:

FIG. 1 is a block diagram showing an embodiment of a rotary speed detector in accordance with the present invention; and FIG. 2 is a diagram showing the relation between angle variations (A) AND REVOLUTIONS PER SECOND (N) in accordance with the present invention.

DETAILED DESCRIPTION OF THE PREFERRED EMBODIMENTS

A rotary speed detector in accordance with a preferred embodiment of the present invention will be described with reference to the attached drawings.

As shown in FIG. 1, the rotary speed detector 10 detects the rotating speed of an electric motor M which drives a wheel of a vehicle (not shown). The rotary speed detector 10 includes a rotating angle sensor 11, a gate array (G/A) 12 which constitutes an angle variation calculating means and a central processing unit (CPU) 13 which constitutes a rotary speed calculating means. The rotating angle sensor 11 has a conventional resolver 11$a$ and a resolver/digital (R/D) converter 11$b$. The R/D converter 11$b$ converts analog signals which are output by the resolver 11$a$ into 12 bit digital signals. The digital signals which are output by the R/D converter 11$b$ are rotating angle data A of the electric motor M. Every 90 degree revolution of the electric motor M contains variables ranging (point-by-point, sequentially) from 0 to 4095, which are the base for the rotating angle data A.

The G/A 12 latches the rotating angle data A which are output by the rotating angle sensor 11 at 250 $\mu$s (microsecond) intervals. In detail, the G/A 12 includes latch portions 12$a$ and 12$b$, a angle variation calculating portion 12$c$ and a buffer 12$d$. The G/A 12 latches the present rotating angle data A(n) at the latch portion 12$a$ and the last rotating angle data A(n-1) at the latch portion 12$b$. The angle variation calculating portion 12$c$ calculates an amount of an angle variation $\Delta$ A. The angle variation $\Delta$ A is obtained by subtracting the present rotating angle data A(n) from the last rotating angle data A(n-1). The buffer 12 is a four-layer type of buffer such that the buffer hangs four angle variations $\Delta$ A(n), $\Delta$ A(n-1), $\Delta$ A(n-2) and $\Delta$ A(n-3) in order.

A set of four angle variations $\Delta$ A(n), $\Delta$ A(n-1), $\Delta$ A(n-2) and $\Delta$ A(n-3) transfers from the buffer 12$d$ to CPU 13 at 1 ms (millisecond) intervals. The CPU 13 hangs four sets of four angle variations from $\Delta$ A(n) to $\Delta$ A(n-15) in order. The CPU 13 calculates the sum total sixteen angle variations from $\Delta$ A(n) to $\Delta$ A(n-15) at 4 ms (millisecond) intervals.

Further, the CPU 13 calculates revolutions per minute N (rpm) by the formula below.

$$N = (\text{the sum total sixteen angle variations} \div 4096 \times 4) \times (60000 \div 4)$$

In this embodiment, as shown in FIG. 2, the relation between the angle variation $\Delta$ A and the revolutions per minute N is a direct proportion. Therefore, it is possible to calculate the revolutions per minute N quickly. In addition, the accuracy of the calculation is constant whether the motor M is operating at a low rotating speed or a high rotating speed.

While the preferred embodiments have been described, variations thereto will occur to those skilled in the art within the scope of the present inventive concepts which are delineated by the following claims.

What is claimed is:

1. A rotary speed detector comprising:
   a rotary angle sensor for outputting signals which comprise rotating angle data of a rotating member;
   an angle variation latch which latches an angle variation of the rotating angle data for a predetermined interval and which holds a set of sequential angle variations of the rotating angle data; and
   a rotary speed calculating means for importing the set of sequential angle variations holding a plurality of sets of sequential angle variations, estimating a sum of the angle variations, and calculating a rotary speed of the rotating member based on the sum of the angle variations.

* * * * *